United States Patent
Matsuo

(10) Patent No.: US 9,434,373 B2
(45) Date of Patent: Sep. 6, 2016

(54) AUTOMATIC TRANSMISSION CONTROL DEVICE

(71) Applicants: JATCO LTD, Fuji-shi, Shizuoka (JP); NISSAN MOTOR CO., LTD., Yokohama-shi, Kanagawa (JP)

(72) Inventor: Katsuhiro Matsuo, Isehara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 169 days.

(21) Appl. No.: 14/358,657

(22) PCT Filed: Oct. 23, 2012

(86) PCT No.: PCT/JP2012/077277
§ 371 (c)(1),
(2) Date: May 15, 2014

(87) PCT Pub. No.: WO2013/073341
PCT Pub. Date: May 23, 2013

(65) Prior Publication Data
US 2014/0329643 A1 Nov. 6, 2014

(30) Foreign Application Priority Data
Nov. 18, 2011 (JP) .................................. 2011-253329

(51) Int. Cl.
*B60W 10/11* (2012.01)
*F16H 61/16* (2006.01)
*B60W 10/06* (2006.01)
(Continued)

(52) U.S. Cl.
CPC .............. *B60W 10/11* (2013.01); *B60W 10/06* (2013.01); *F16H 61/0213* (2013.01); *F16H 61/16* (2013.01); *F16H 59/44* (2013.01); *F16H 61/684* (2013.01); *F16H 2059/006* (2013.01); *F16H 2059/186* (2013.01); *F16H 2061/0225* (2013.01); *F16H 2061/0227* (2013.01); *F16H 2061/161* (2013.01); *Y10T 477/688* (2015.01)

(58) Field of Classification Search
CPC .............. B60W 10/11; F16H 61/0213; Y10T 477/688; Y10T 477/692; Y10T 477/60
See application file for complete search history.

(56) References Cited

U.S. PATENT DOCUMENTS

| 6,085,139 A | 7/2000 | Nakauchi et al. |
| 8,548,700 B2 | 10/2013 | Endo et al. |

(Continued)

FOREIGN PATENT DOCUMENTS

| JP | 07-083327 A | 3/1995 |
| JP | 11-294570 A | 10/1999 |

(Continued)

*Primary Examiner* — Huan Le
(74) *Attorney, Agent, or Firm* — Foley & Lardner LLP

(57) ABSTRACT

A control apparatus for an automatic transmission is provided with an automatic gearshift mode and a manual gearshift mode. The control apparatus changes a gearshift characteristic of the automatic transmission in response to a situation where an accelerator pedal opening is smaller than a predetermined opening, so that downshifting occurs at higher vehicle speed than in a situation where the accelerator pedal opening is greater than or equal to the predetermined opening. While the manual gearshift mode is being selected, the control apparatus inhibits change of the gearshift characteristic until downshifting is performed once, and permits change of the gearshift characteristic after downshifting is performed once.

4 Claims, 5 Drawing Sheets

(51) Int. Cl.
*F16H 61/02* (2006.01)
*F16H 61/684* (2006.01)
*F16H 59/00* (2006.01)
*F16H 59/44* (2006.01)
*F16H 59/18* (2006.01)

(56) References Cited

U.S. PATENT DOCUMENTS

2007/0099752 A1* 5/2007 Saito et al. .................... 477/34
2007/0099756 A1  5/2007 Saito et al.
2010/0010716 A1* 1/2010 Sawada et al. ................. 701/52
2011/0118947 A1  5/2011 Endo et al.
2011/0130928 A1* 6/2011 Matsunaga et al. ............ 701/52
2013/0110360 A1* 5/2013 Saito et al. ..................... 701/51

FOREIGN PATENT DOCUMENTS

| | | | |
|---|---|---|---|
| JP | 2005-133903 A | 5/2005 |
| JP | 2007-315520 A | 12/2007 |
| JP | 2008-111510 A | 5/2008 |
| JP | 2011-106581 A | 6/2011 |
| JP | 2011-169372 A | 9/2011 |

* cited by examiner

AUTOMATIC GEARSHIFT LINE

MANUAL GEARSHIFT LINE

LOCKUP LINE

AUTOMATIC TRANSMISSION CONTROL DEVICE

TECHNICAL FIELD

The present invention relates to a gearshift control at downshifting of an automatic transmission.

BACKGROUND ART

Conventionally, a patent document 1 discloses a technique to cause an engine rotational speed to fall as low as possible during traveling, and then perform downshifting at lower speed, in order to improve fuel efficiency.

However, when downshifting is performed at low vehicle speed, the downshifting occurs under a drive condition, because the engine rotational speed cannot fall is below an idling rotational speed. In this situation, there is a problem that a pushing shock is likely to occur also because of a torque amplification effect of a torque converter. Especially, when a pushing shock is caused by downshifting during coasting, the pushing shock causes a driver to feel uncomfortable, because the pushing shock is not a result from a driver's request for driving force.

PRIOR ART DOCUMENT(S)

Patent Document(s)

Patent Document 1: Japanese Patent Application Publication 2011-106581

SUMMARY OF THE INVENTION

The present invention has been made to address the problem described above. It is an object of the present invention to provide an automatic transmission control apparatus with which a driver can be suppressed from feeling uncomfortable and fuel efficiency can be improved.

Means to Solve the Problem(s)

In order to achieve the object described above, according to the present invention, an automatic transmission control apparatus is provided with an automatic gearshift mode and a manual gearshift mode, wherein: when in the automatic gearshift mode, the automatic transmission control apparatus performs gearshifting automatically based on a relationship between an automatic gearshift line and an operating point, wherein the automatic gearshift line is defined with respect to vehicle speed, and wherein the operating point is determined by a sensed vehicle speed; when in the manual gearshift mode, the automatic transmission control apparatus performs gearshifting based on driver's manual operation and a relationship between a manual gearshift line and the sensed vehicle speed, and rejects driver's upshift operation in a situation where the sensed vehicle speed is lower than or equal to a predetermined vehicle speed, wherein the manual gearshift line is defined with respect to vehicle speed; and the automatic transmission control apparatus comprises: a gearshift characteristic change means that changes a gearshift characteristic of an automatic transmission in response to a situation where an accelerator pedal opening is smaller than a predetermined opening, so that downshifting occurs at higher vehicle speed than in a situation where the accelerator pedal opening is greater than or equal to the predetermined opening; and a gearshift characteristic change inhibition/permission means, wherein while the manual gearshift mode is being selected, the gearshift characteristic change inhibition/permission means inhibits change of the gearshift characteristic until downshifting is performed once, and permits change of the gearshift characteristic after downshifting is performed once.

The present invention allows to cause downshifting at higher vehicle speed when the accelerator pedal opening is small, and thereby suppress the torque outputted from the engine side during downshifting, and thereby suppress a pushing shock causing an uncomfortable feeling of the driver. Moreover, the feature of inhibiting the change of the gearshift characteristic by the gearshift characteristic change means when the downshifting is performed in the first time when in the manual gearshift mode, serves to suppress the driver from feeling uncomfortable.

MODE(S) FOR CARRYING OUT THE INVENTION

Embodiment 1

Figure 1:
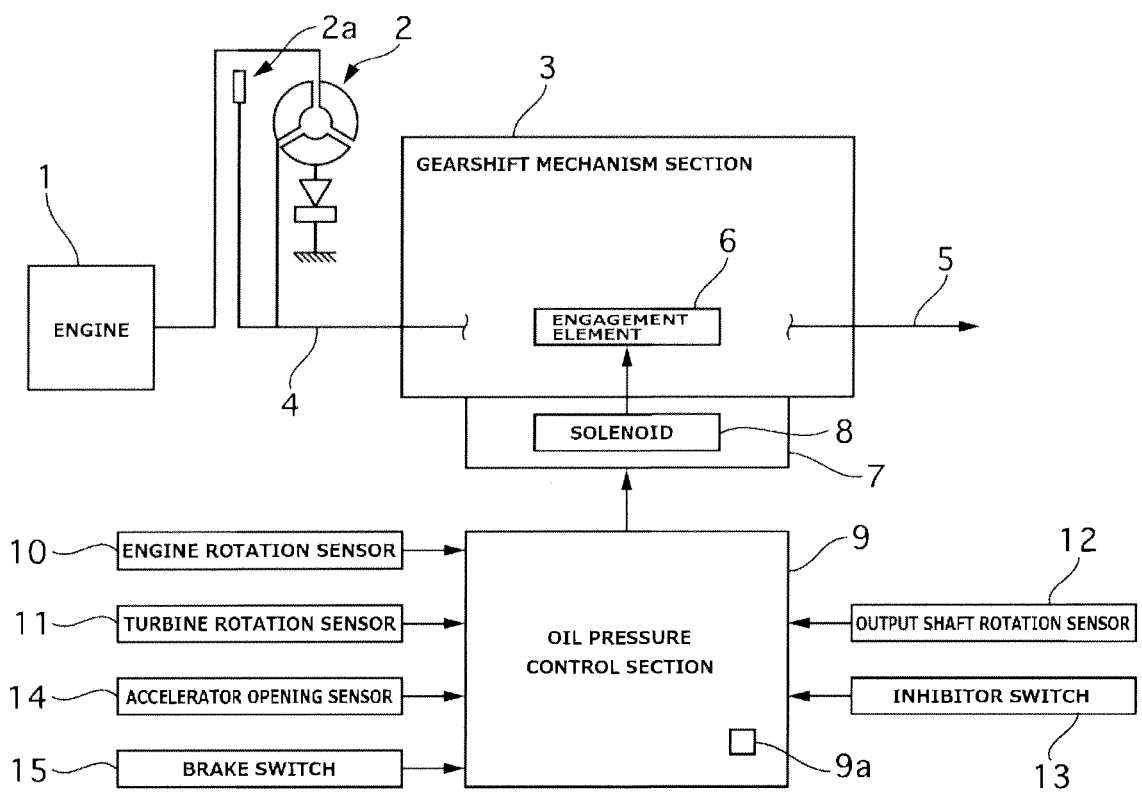
FIG. 1 is a schematic diagram showing system configuration of an automatic transmission according to a first embodiment.

FIG. 1 is a schematic diagram showing system configuration of an automatic transmission according to a first embodiment. An engine 1 is connected to a gearshift mechanism section 3 of the automatic transmission through a torque converter 2. An output of engine 1 is controlled by a throttle valve whose opening increases from a fully is closed position to a fully opened position in connection with an accelerator pedal operated by a driver. Output rotation of engine 1 is inputted to an input shaft 4 of gearshift mechanism section 3 through the torque converter 2. Torque converter 2 is a known device which has a function of amplifying an output torque of engine 1 by producing an input-output differential rotation. Torque converter 2 includes a lockup clutch 2a which is capable of suppressing the input-output differential rotation, namely, directly connecting the engine 1 to gearshift mechanism section 3 by suppressing the torque amplification function.

Gearshift mechanism section 3 is configured by arranging a front planetary gearset not shown and a rear planetary gearset not shown along the input shaft 4 and an output shaft 5 which are coaxially arranged. Gearshift mechanism section 3 switches power transmission paths by combination of engagement/disengagement of a plurality of engagement elements 6 which are hydraulically operated, and thereby establishes desired gear ratios.

A valve body 7 is formed with an oil passage not shown for supplying oil pressure to each engagement element 6. In valve body 7, a solenoid 8 is actuated based on a command inputted from an oil pressure control section 9, and is controlled to operate a pressure-regulating valve not shown provided in each oil passage, and thereby supply a corresponding engagement element with an oil pressure of a command value set by oil pressure control section 9. While a vehicle is traveling, solenoid 8 is controlled to supply oil pressure only to each engagement element is whose engagement is required to obtain a desired gear ratio.

Oil pressure control section 9 determines a command value of working oil pressure supplied to engagement elements which are to be engaged, based on outputs of an engine rotation sensor 10, a turbine rotation sensor 11, an output shaft rotation sensor 12, an inhibitor switch 13, an accelerator opening sensor 14, a brake switch 15, etc., wherein engine rotation sensor 10 senses engine rotational speed, and turbine rotation sensor 11 senses the rational speed of input shaft 4, and output shaft rotation sensor 12 senses the rotational speed of output shaft 5 (corresponding to vehicle speed), and inhibitor switch 13 senses an operating state of a shift lever operated by the driver, and accelerator opening sensor 14 senses the opening of the accelerator pedal operated by the driver, and brake switch 15 senses an operating state of the brake pedal operated by the driver. Then, oil pressure control section 9 outputs a command to drive the solenoid 8 for supplying oil pressure of the determined command value to the engagement elements.

In the vehicle provided with the automatic transmission according to the first embodiment, the shift lever operated by the driver is provided with a drive range (henceforth referred to as D range) for requesting automatic gearshifting and a manual range (henceforth referred to as M range) in which gearshifting is performed in accordance with driver's intention of gearshifting. The M range is provided with an upshift request switch, a downshift request switch, and a neutral position for holding a present gear position. When the driver operates the shift lever from the neutral position to the upshift side, the upshift request switch is turned on to output an upshift request. When the driver operates the shift lever from the neutral position to the downshift side, the downshift request switch is turned on to output a downshift request.

Figure 2A:
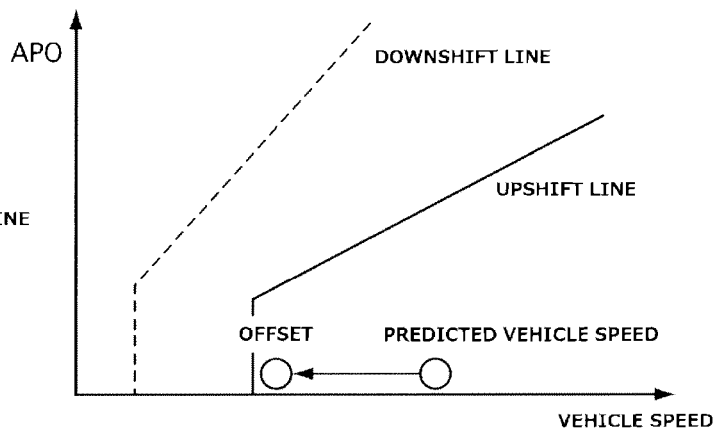
FIGS. 2A, 2B and 2C show a gearshift line used in a gearshift control processing according to the first embodiment.
Figure 2B:
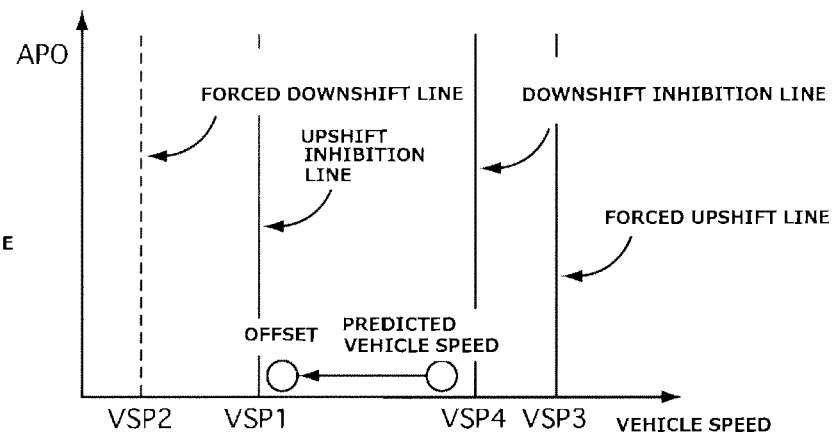
Figure 2C:
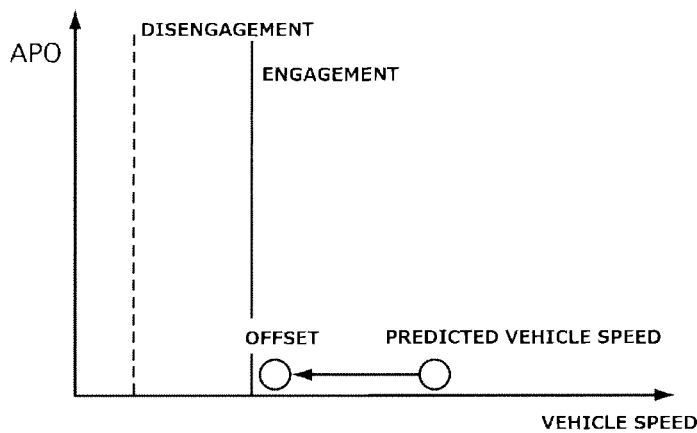

FIG. 2 shows a gearshift line used in a gearshift control processing according to the first embodiment. Oil pressure control section 9 is provided with various maps for determining a gear position and the engagement/disengagement state of the lockup clutch, based on the traveling condition. FIG. 2A shows as an example a part of a gearshift map used in an automatic gearshift mode. This map is actually provided with a plurality of lines for respective gear positions provided in gearshift mechanism section 3. FIG. 2B shows as an example a part of a gearshift map used in a manual gearshift mode. This map is actually provided with a plurality of lines for respective gear positions provided in gearshift mechanism section 3. FIG. 2C shows as an example a lockup map. When these maps are used, a vehicle speed after a predetermined time interval is calculated based on a sensed present vehicle speed and a to sensed present acceleration, and this calculated vehicle speed (henceforth referred to as predicted vehicle speed) is used as a vehicle speed VSP in a horizontal axis. This is to prevent a delay of gearshifting with respect to a shift schedule predetermined by a gearshift line, and perform a gearshift control in suitable timing. Because gearshifting is implemented by performing a predetermined processing after a gearshift command has been outputted, it is to prevent a relationship between actual gearshift timing and vehicle speed from being changed by deceleration or acceleration during the time interval.

While the D range is being selected, the gearshift map shown in FIG. 2A is used to perform the automatic gearshift mode to perform gearshifting automatically based on the operating point defined by accelerator pedal opening APO by the driver and predicted vehicle speed VSP. When the operating point passes across an upshift line from the left side to the right side in FIG. 2A, an upshift command is outputted. When the operating point passes across a downshift line from the right side to the left side in FIG. 2A, a downshift command is outputted. The downshift line is arranged in a region of lower vehicle speed than the upshift line. This is to prevent hunting between the upshift command and the downshift command.

While the M range is being selected, the manual gearshift mode is performed to perform manual gearshifting based on the upshift request and the downshift request by the driver. In the manual gearshift mode, the manual gearshift map shown in FIG. 2B is used. Specifically, the manual gearshift map is provided with an upshift inhibition line for rejecting the driver's upshift request when the vehicle speed is lower than or equal to a predetermined vehicle speed VSP1, and a forced downshift line for performing a force downshift from the present gear position when the vehicle speed is lower than or equal to VSP2 that is lower than VSP1. This is because if upshifting is performed to the second gear position when the vehicle is traveling at lower speed than VSP1 with the first gear position selected, it is possible that the engine rotational speed falls below the idling rotational speed to cause engine stalling or the like. Similarly, downshifting is forced when the vehicle speed is lower than VSP2, because if the vehicle speed further decreases when the vehicle is traveling at higher speed than VSP2 with the second gear position selected, it is possible that the engine rotational speed falls below the idling rotational speed to cause engine stalling or the like.

Moreover, a forced upshift line is set at VSP3 on the higher vehicle speed side for forcing an upshift to prevent the engine rotational speed from overshooting, and a downshift inhibition line is set at VSP4 for rejecting the downshift request to prevent the engine rotational speed from overshooting due to downshifting.

The lockup map is provided with a lockup engagement line for engaging the lockup clutch 2a when the vehicle speed is higher than or equal to a predetermined engagement vehicle speed, and thereby enhancing the fuel efficiency, and a lockup disengagement line for disengaging the lockup clutch 2a when the vehicle speed is lower than a disengagement vehicle speed.

Oil pressure control section 9 includes a vehicle speed offset processing part 9a (gearshift characteristic change means, or lockup characteristic change means) for offsetting the predicted vehicle speed to the lower vehicle speed side at downshifting during deceleration, when referring to the maps shown in FIG. 2. In other words, downshifting is configured to be performed at higher vehicle speed.

Figure 3:
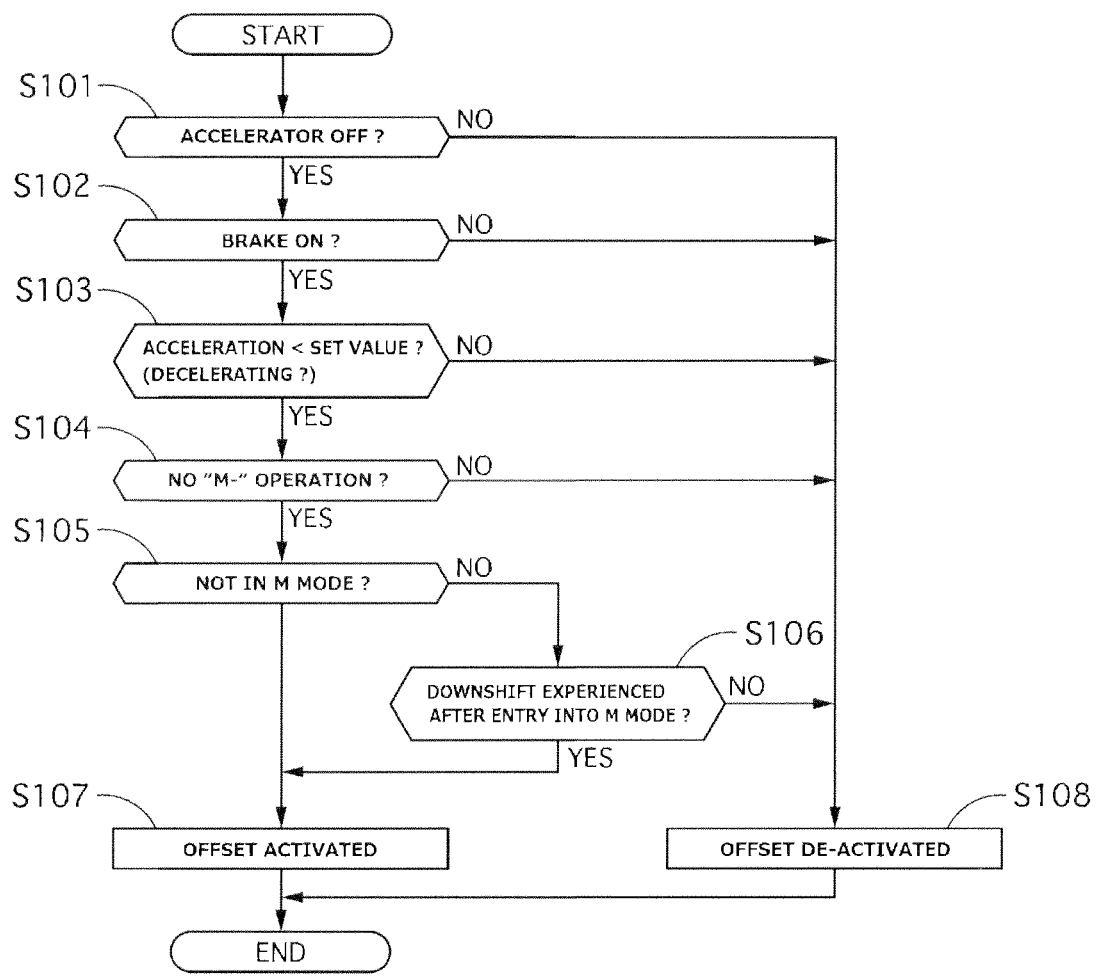
FIG. 3 is a flow chart showing a vehicle speed offset processing according to the first embodiment.

FIG. 3 is a flow chart showing a vehicle speed offset processing according to the first embodiment. At Step S101, it determines based on a sensing value of accelerator opening sensor 14 whether or not the accelerator is off (smaller than a predetermined opening). When the accelerator is off, it proceeds to Step S102. Otherwise, it proceeds to Step S108. At Step S102, it determines whether or not the brake pedal is on (brake switch is on). When the brake pedal is on, it proceeds to Step S103. Otherwise, it proceeds to Step S108. At Step S103, it determines whether or not the acceleration is smaller than a set value, namely, whether or not the vehicle is decelerating. When the vehicle is decelerating, proceeds to Step S104. Otherwise, it proceeds to Step S108. At Step S104, it determines whether or not no downshift request is presented in the M mode. When no downshift request is presented in the M mode, it proceeds to Step S105. Otherwise, it proceeds to Step S108. Accordingly, when the driver performs a downshift operation while the manual gearshift mode is being selected, change of the gearshift characteristic is inhibited. At Step S105, it determines whether or not the M mode is inactive. When the M mode is inactive, it proceeds to Step S107. Otherwise, it proceeds to Step S106. At Step S106, it determines whether or not downshifting has been experienced after entry into the M mode, namely, whether or not downshifting is performed once after entry into the M mode. When downshifting is performed once after entry into the M mode, it proceeds to Step S107. Otherwise, it proceeds to Step S108. At Step S107, it activates the vehicle speed offset processing. At Step S108, it de-activates the vehicle speed offset processing.

Figure 4:
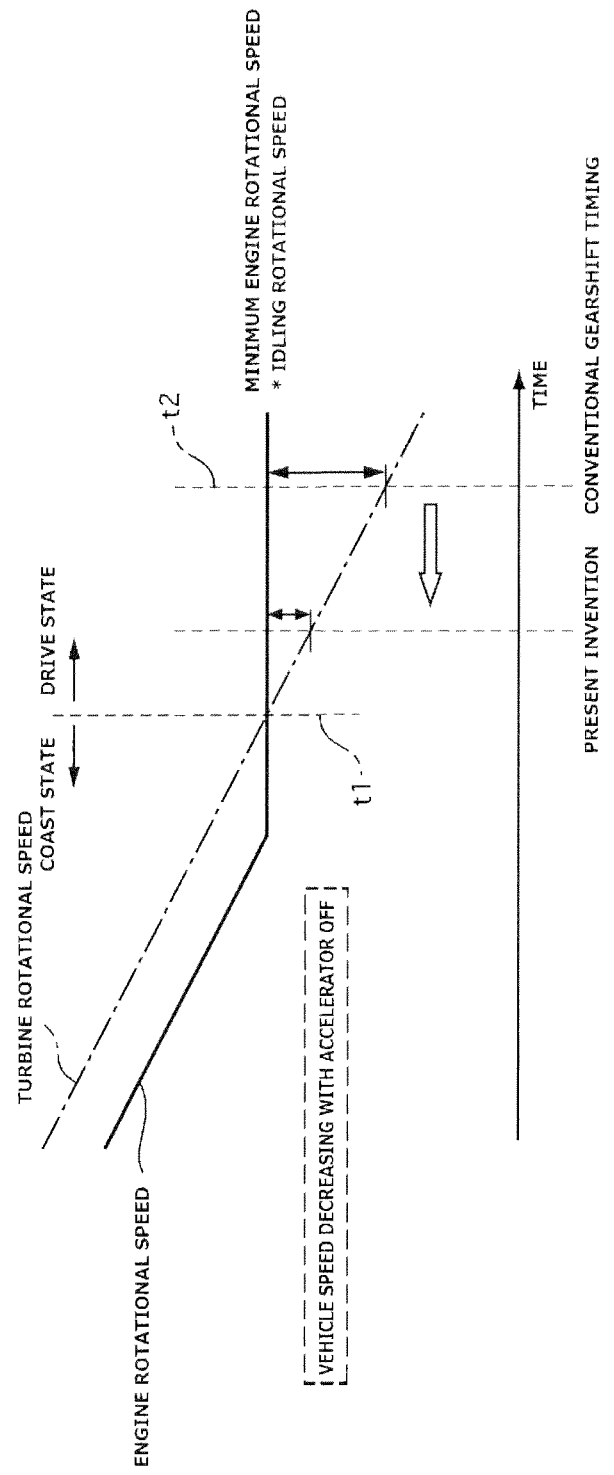
FIG. 4 is a time chart showing a relationship between engine rotational speed and turbine rotational speed during deceleration.

The following describes behavior of the control processing described above. First, the following describes why the vehicle speed offset processing is performed. FIG. 4 is a time chart showing a relationship between engine rotational speed and turbine rotational speed during deceleration. When the vehicle is decelerating with the accelerator pedal off, the engine rotational speed is lower and the turbine rotational speed is higher, basically. This is because rotation is being inputted from the output side of torque converter 2 so that the engine is rotated through the torque converter 2. In this situation, fuel injection is cut off in a region down to a predetermined engine rotational speed, to improve the fuel efficiency. Then, fuel injection is restarted before the engine rotational speed reaches the idle rotational speed, and the engine is controlled to continue to rotate independently.

When the engine rotational speed reaches the idling rotational speed under the condition described above, wherein the idling rotational speed is the minimum engine rotational speed, the engine rotational speed becomes a constant value because the engine rotational speed cannot be further reduced. However, when the vehicle is decelerating, the turbine rotational speed gradually falls because the turbine rotates solidly with driving wheels, so that the turbine rotational speed falls below the engine rotational speed at a time instant t1. In this situation, a torque is outputted from the engine side to the driving wheels, and the torque amplification effect is activated under influence of torque converter 2. Namely, although the driver is recognizing that the vehicle is decelerating in coast state, the vehicle is actually in drive state where the torque is outputted from the engine side. Under this condition, when downshifting is performed after the differential rotation between engine rotational speed and turbine rotational speed becomes large at a time instant t2, it may cause a pushing shock during gearshifting. In other words, unless downshifting is performed in earlier timing (at higher vehicle speed), the differential rotation between engine rotational speed and turbine rotational speed becomes larger and larger, thereby increasing the uncomfortable feeling of the driver.

Accordingly, in the first embodiment, the predicted vehicle speed is offset to the lower vehicle speed side, so that downshifting is performed in earlier timing. Conventionally, as shown in the time chart of FIG. 4, downshifting is performed when the differential rotation between engine rotational speed and turbine rotational speed has become large, thereby causing a pushing shock. In contrast, in the first embodiment, the vehicle speed offset processing serves to reduce the differential rotation, and thereby reduce the pushing shock resulting from the downshifting. For example, the threshold value of the acceleration to which reference is made to perform the vehicle speed offset processing is set so that the vehicle speed offset processing is performed at smaller deceleration, and the gearshift characteristic can be changed in quicker response as compared to a case where the gearshift characteristic is changed only by calculation of predicted vehicle speed.

Figure 5:
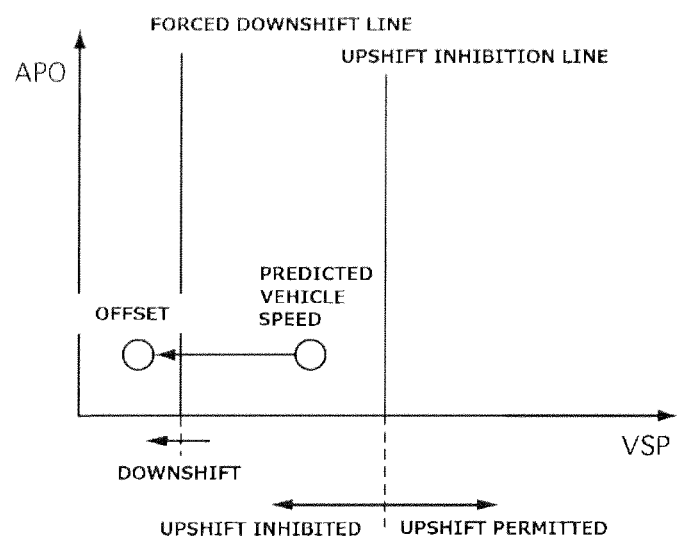
FIG. 5 is a diagram showing a relationship with a forced downshift line in a case where a predicted vehicle speed is offset while an M mode is being selected.

If the vehicle speed offset processing is performed, the following problem occurs when in the M mode. FIG. 5 is a diagram showing a relationship with a forced downshift line in a case where the predicted vehicle speed is offset while the M mode is being selected. In the M mode, when a driver's upshift request or downshift request is present, gearshifting is going to be started to satisfy the request basically. Simultaneously, with reference to the manual gearshift map, it determines where the predicted vehicle speed is located with respect to the gearshift lines in the manual gearshift map, and the conditions of these set lines in the manual gearshift map are highly prioritized.

It is assumed that when the M mode is being selected, the predicted vehicle speed is in a region between the upshift inhibition line and the forced downshift line. If an upshift request is presented by the driver under that condition, the upshift request is rejected because the predicted vehicle speed is located on the lower vehicle speed side of the upshift inhibition line. If the vehicle speed offset processing is performed at that time, it is possible that the predicted vehicle speed passes across the forced downshift line, so that downshifting is performed irrespective of the driver's request. Namely, although the driver is requesting an upshift, downshifting is performed as a result, thereby causing the driver to feel uncomfortable. Accordingly, until downshifting is performed once, the vehicle speed offset processing is not performed (gearshift characteristic change inhibition/permission means). If downshifting is performed once without performing the vehicle speed offset processing, the manual gearshift map is switched to a map corresponding to the gear position after downshifting, so that no uncomfortable feeling as described above occurs. Accordingly, thereafter, the vehicle speed offset processing activated.

If a downshift request is raised when the M mode is being selected, the vehicle speed offset processing is de-activated. If gearshifting is determined based on the offset vehicle speed, the vehicle speed at which the downshift operation is accepted is on the higher vehicle speed side so that the engine rotational speed may overshoot. Accordingly, during downshift operation, the gearshift characteristic is inhibited from being changed.

Moreover, with regard to the engagement/disengagement control of the lockup clutch, the offset vehicle speed obtained by the vehicle speed offset processing described above is used (lockup characteristic change means). This serves to shift the disengagement of torque converter 2 to the higher vehicle speed side, and thereby suppress the occurrence of downshifting under the condition where torque converter 2 is engaged, and thereby suppress the gearshift shock.

As described above, the first embodiment produces the following effects. <1> An automatic transmission control apparatus provided with an automatic gearshift mode and a manual gearshift mode, wherein: when in the automatic gearshift mode, the automatic transmission control apparatus performs gearshifting automatically based on a relationship between an automatic gearshift line and an operating point, wherein the automatic gearshift line is defined with respect to vehicle speed, and wherein the operating point is determined by a predicted vehicle speed (sensed vehicle speed); when in the manual gearshift mode, the automatic transmission control apparatus performs gearshifting based on driver's manual operation and a relationship between a manual gearshift line and the predicted vehicle speed, and rejects driver's upshift operation in a situation where the predicted vehicle speed is lower than or equal to a predetermined vehicle speed, wherein the manual gearshift line is defined with respect to vehicle speed; and the automatic transmission control apparatus includes: a vehicle speed offset processing part 9a (gearshift characteristic change means) that changes a gearshift characteristic of an automatic transmission in response to a situation where an accelerator pedal opening is off (smaller than a predetermined opening), so that downshifting occurs at higher vehicle speed than in a situation where the accelerator pedal opening is on (greater than or equal to the predetermined opening); and a Step 106 (gearshift characteristic change inhibition/permission means), wherein while the manual gearshift mode is being selected, change of the gearshift characteristic is inhibited until downshifting is performed once, and change of the gearshift characteristic is permitted after downshifting is performed once. This allows the downshifting to be performed at higher vehicle speed when the accelerator pedal opening is small, and thereby suppress the torque output from the engine side during downshifting, and suppress the pushing shock causing the driver to feel uncomfortable.

When the driver switches to the manual gearshift mode and performs an upshift operation when the vehicle is traveling at a predetermined vehicle speed with which upshift operation in the manual gearshift mode is not accepted, the upshift operation is not carried out. However, if the vehicle speed offset processing changes the gearshift characteristic to cause a downshift, the deriver feels uncomfortable because the caused downshift is opposite to the upshift operation of the driver. Accordingly, it inhibits the change of the gearshift characteristic by the gearshift characteristic change means if the downshift is in the first time during the manual gearshift mode, and thereby suppresses the uncomfortable feeling of the driver. After downshifting is performed once, no uncomfortable feeling is caused. Accordingly, after downshifting is experienced once, it permits the change of the gearshift characteristic, namely, performs the vehicle speed offset processing, and thereby suppress the pushing shock causing the driver's uncomfortable feeling when the accelerator pedal opening is small.

<2> The automatic transmission control is configured so that: when in the manual gearshift mode, the automatic transmission control apparatus rejects driver's downshift operation in a situation where the predicted vehicle speed is higher than or equal to VSP4 (a predetermined vehicle speed); the vehicle speed offset processing part 9a obtains an offset vehicle speed by correcting the predicted vehicle speed to a lower vehicle speed side, and changes the gearshift characteristic so that gearshifting is performed based on a relationship between the offset vehicle speed and one of the automatic gearshift line and the manual gearshift line; and the Step 104 (gearshift characteristic change inhibition/permission means) inhibits change of the gearshift characteristic in response to a situation where driver's downshift operation occurs while the manual gearshift mode is being selected. This serves to offset the predicted vehicle speed to the higher vehicle speed side, and thereby prevent the engine rotational speed from overshooting.

<3> The automatic transmission control apparatus further includes: a lockup map (lockup clutch control means) that controls engagement/disengagement of a lockup clutch 2a of a torque converter 2 based on a is relationship between a lockup clutch gearshift line and the sensed vehicle speed, wherein the torque converter 2 is disposed between an engine 1 and the gearshift mechanism section 3 (automatic transmission), and wherein the lockup clutch gearshift line is defined with respect to vehicle speed: and vehicle speed offset processing part 9a (lockup clutch characteristic change means) that changes a lockup clutch control characteristic in response to a situation where the gearshift characteristic is changed, so that disengagement of the lockup clutch occurs at higher vehicle speed than in a situation where the gearshift characteristic is unchanged. The feature that the disengagement of torque converter 2 is shifted to the higher vehicle speed side serves to suppress the occurrence of downshifting under the condition where torque converter 2 is engaged when the gearshift characteristic is changed, and thereby reduce the gearshift shock.

Although the foregoing describes the gearshift characteristic change processing according to the present invention with reference to the embodiment, the invention is not limited to the configuration described above but may be modified. Although the gearshift control is performed by using the predicted vehicle speed in the first embodiment, the gearshift control may be performed to simply based on the present vehicle speed.

The invention claimed is:

1. An automatic transmission control apparatus provided with an automatic gearshift mode and a manual gearshift mode, wherein:
  when in the automatic gearshift mode, the automatic transmission control apparatus performs gearshifting automatically based on a relationship between an automatic gearshift line and an operating point, wherein the automatic gearshift line is defined with respect to vehicle speed, and wherein the operating point is determined by a sensed vehicle speed;
  when in the manual gearshift mode, the automatic transmission control apparatus performs gearshifting based on a manual operation of a driver and a relationship between a manual gearshift line and the sensed vehicle speed, and rejects an upshift operation of the driver in a situation where the sensed vehicle speed is lower than or equal to a predetermined vehicle speed, wherein the manual gearshift line is defined with respect to vehicle speed; and
  the automatic transmission control apparatus comprises
    a gearshift characteristic change section that changes a gearshift characteristic of an automatic transmission in response to a situation where an accelerator pedal opening is smaller than a predetermined opening, so that downshifting occurs at a higher vehicle speed than in a situation where the accelerator pedal opening is greater than or equal to the predetermined opening; and
    a gearshift characteristic change inhibition/permission section, wherein while the manual gearshift mode is being selected, the gearshift characteristic change inhibition/permission section inhibits change of the gearshift characteristic until downshifting is performed once, and permits change of the gearshift characteristic after downshifting is performed once.

2. The automatic transmission control apparatus as claimed in claim 1, wherein:

when in the manual gearshift mode, the automatic transmission control apparatus rejects a downshift operation of the driver in a situation where the sensed vehicle speed is higher than or equal to another predetermined vehicle speed;

the gearshift characteristic change section obtains an offset vehicle speed by correcting the sensed vehicle speed to a lower vehicle speed side, and changes the gearshift characteristic so that gearshifting is performed based on a relationship between the offset vehicle speed and one of the automatic gearshift line and the manual gearshift line; and the gearshift characteristic change inhibition/permission section inhibits change of the gearshift characteristic in response to a situation where the downshift operation of the driver occurs while the manual gearshift mode is being selected.

3. The automatic transmission control apparatus as claimed in claim 2, further comprising:

a lockup clutch control section that controls engagement/disengagement of a lockup clutch of a torque converter based on a relationship between a lockup clutch gearshift line and the sensed vehicle speed, wherein the torque converter is disposed between an engine and the automatic transmission, and wherein the lockup clutch gearshift line is defined with respect to vehicle speed; and a lockup clutch characteristic change section that changes a lockup clutch control characteristic in response to a situation where the gearshift characteristic is changed, so that disengagement of the lockup clutch occurs at another higher vehicle speed than in a situation where the gearshift characteristic is unchanged.

4. The automatic transmission control apparatus as claimed in claim 1, further comprising:

a lockup clutch control section that controls engagement/disengagement of a lockup clutch of a torque converter based on a relationship between a lockup clutch gearshift line and the sensed vehicle speed, wherein the torque converter is disposed between an engine and the automatic transmission, and wherein the lockup clutch gearshift line is defined with respect to vehicle speed; and a lockup clutch characteristic change section that changes a lockup clutch control characteristic in response to a situation where the gearshift characteristic is changed, so that disengagement of the lockup clutch occurs at another higher vehicle speed than in a situation where the gearshift characteristic is unchanged.

* * * * *